Figure 1:
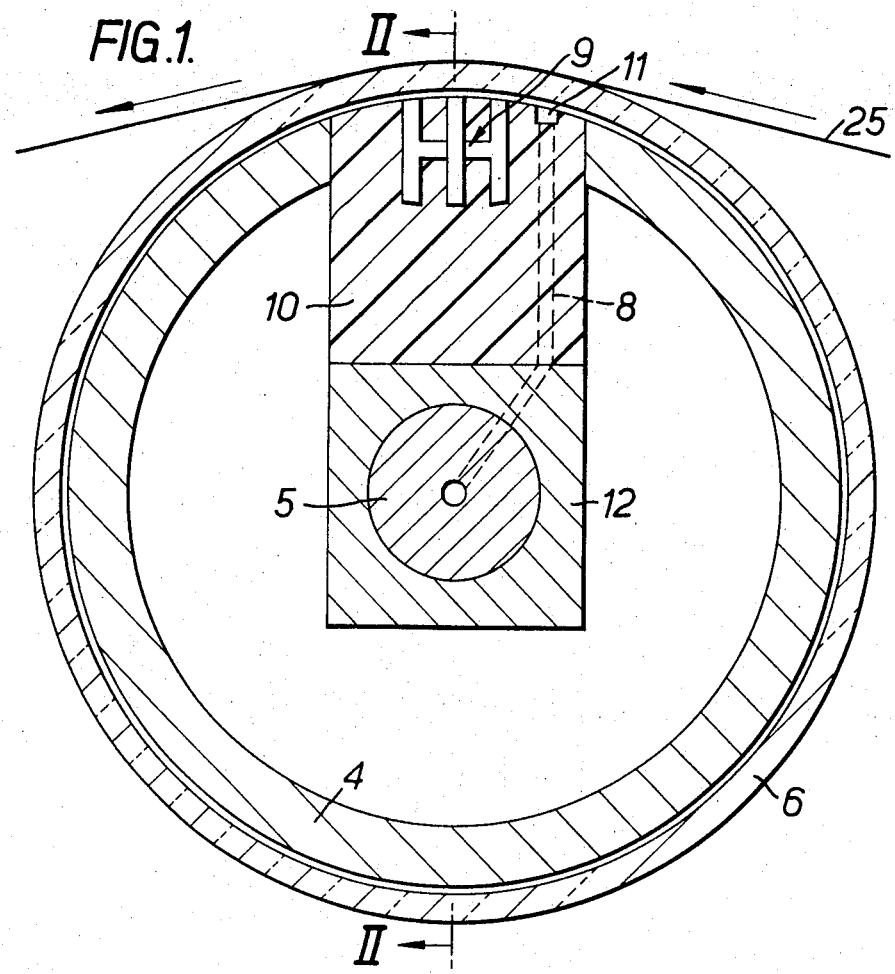

United States Patent [19]
Davis

[11] 3,781,662
[45] Dec. 25, 1973

[54] APPARATUS FOR DETERMINING THE PERMEABILITY OR STRESS IN A MOVING MAGNETIC STRIP IN TWO ORTHOGONAL DIRECTIONS

[75] Inventor: Norman Davis, London, England

[73] Assignee: The British Iron and Steel Research Association, London, England

[22] Filed: May 31, 1972

[21] Appl. No.: 258,340

[30] Foreign Application Priority Data
June 14, 1971 Great Britain.................. 27,820/71

[52] U.S. Cl.......................... 324/34 ST, 324/34 PE
[51] Int. Cl............................................. G01r 33/12
[58] Field of Search ...................... 324/34 R, 34 ST, 324/37, 40, 61 R; 340/259; 73/159; 308/DIG. 1

[56] References Cited
UNITED STATES PATENTS

| | | | |
|---|---|---|---|
| 3,215,480 | 8/1963 | Marley............................ | 308/DIG. 1 |
| 2,705,302 | 3/1955 | Camp et al........................ | 324/34 R |
| 3,130,363 | 4/1964 | Camp et al........................ | 324/34 R |
| 3,535,625 | 10/1970 | Pratt................................ | 324/34 ST |

OTHER PUBLICATIONS
Dahm, J. R.; On Line Sensor Bages Shape of Strip Steel; Inst. Tech.; May, 1970; pp. 44–59

*Primary Examiner*—Robert J. Corcoran
*Attorney*—Leo A. Rosetta et al.

[57] ABSTRACT

A system for measuring electrical or magnetic properties of moving steel strip. The strip passes over a non-ferromagnetic sleeve which is mounted for rotation about a steel cylinder. The cylinder houses across its width a number of H-shaped ferrite cores mounted in the surface of the cylinder adjacent the pass line of the strip. A magnetic flux is induced between the arms of each ferrite core, this flux being influenced by the presence of the strip. The resulting flux is determined by search coils on the cores and gives a measure of the magnetic permeability of the strip at points across the width of the strip. The internal tensile stress in the steel strip which subsequently determines the shape of the strip is related to the magnetic permeability, and hence it is possible to determine internal tensile stress distributions across the width of the strip which may give rise to bad shape.

7 Claims, 3 Drawing Figures

APPARATUS FOR DETERMINING THE PERMEABILITY OR STRESS IN A MOVING MAGNETIC STRIP IN TWO ORTHOGONAL DIRECTIONS

Proposals have been made in British Patent Specification No. 1,160,124 for the detection of a magnetic property of a moving metal strip. In this proposal two devices are used, one above the metal strip and the other below the strip, to supply a magnetic field to the strip and to detect the resulting magnetic flux.

The type of device described above suffers from the serious disadvantage that if the metal strip breaks, serious damage may be done to the detecting device by the broken edges of the strip.

It is an object of the invention to provide a device for detecting an electrical or magnetic property of metal strip which is unlikely to be damaged due to breaks in the metal strip.

In one aspect of the present invention detecting apparatus is provided for use with a moving metal strip including a hollow cylinder of non-ferromagnetic material mounted for rotation about its longitudinal axis, arranged so that in use the moving metal strip passes partly around the hollow cylinder, and a device for detecting an electrical or magnetic property of the metal strip positioned within said hollow cylinder so that in use the device is adjacent to the strip passing around the exterior of the hollow cylinder.

According to a further aspect of the present invention a method of detecting an electrical or magnetic property of a metal strip includes passing strip partly around a hollow cylinder of non-ferromagnetic material to maintain the strip a fixed distance from a detecting device postioned within the hollow cylinder, applying a magnetic flux to the strip and detecting a response to the resulting magnetic flux.

The apparatus preferably includes a non-rotatable cylinder mounted coaxially within the hollow cylinder, said non-rotatable cylinder having a relieved portion extending inwardly from its surface, the detecting device being mounted in said relieved portion.

Preferably lubrication means are incorporated in the non-rotatable cylinder for lubricating the interface between the hollow cylinder and the non-rotatable cylinder. The lubrication means may include ducts and channels for supplying lubricating oil to the interface. Alternatively bearings may be located in the external surface of the non-rotatable cylinder.

The non-rotatable cylinder may be solid or alternatively may be annular in cross-section. The non-rotatable cylinder is suitably mounted on a central shaft running along its longitudinal axis. The device for detecting an electrical or magnetic property of the metal strip may be supported by the central shaft.

Two or more devices for detecting an electrical or magnetic property of the metal strip may be located in the same axial plane. Preferably five or more devices are so spaced across the width of the hollow cylinder, so that an electrical or magnetic property of the metal strip may be detected at several positions across the strip width.

The device preferably includes two mutually perpendicular H-shaped ferrite cores so that an electrical or magnetic property of the strip at the point of detection may be determined in two perpendicular directions.

A typical magnetic property of the metal strip is permeability; a typical electrical property of the metal strip is resistivity. The hollow cylinder is suitably made of high electrical resistance material to ensure that the magnetic flux is influenced by the metal strip. The hollow cylinder may be coated with an abrasion-resistant material, for example tungsten carbide, to reduce wear of the hollow cylinder due to friction between the strip and the sleeve.

Figure 3:
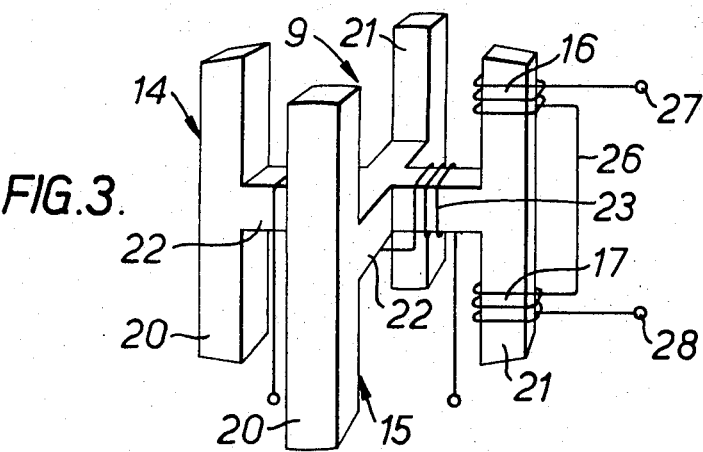
Figure 2:
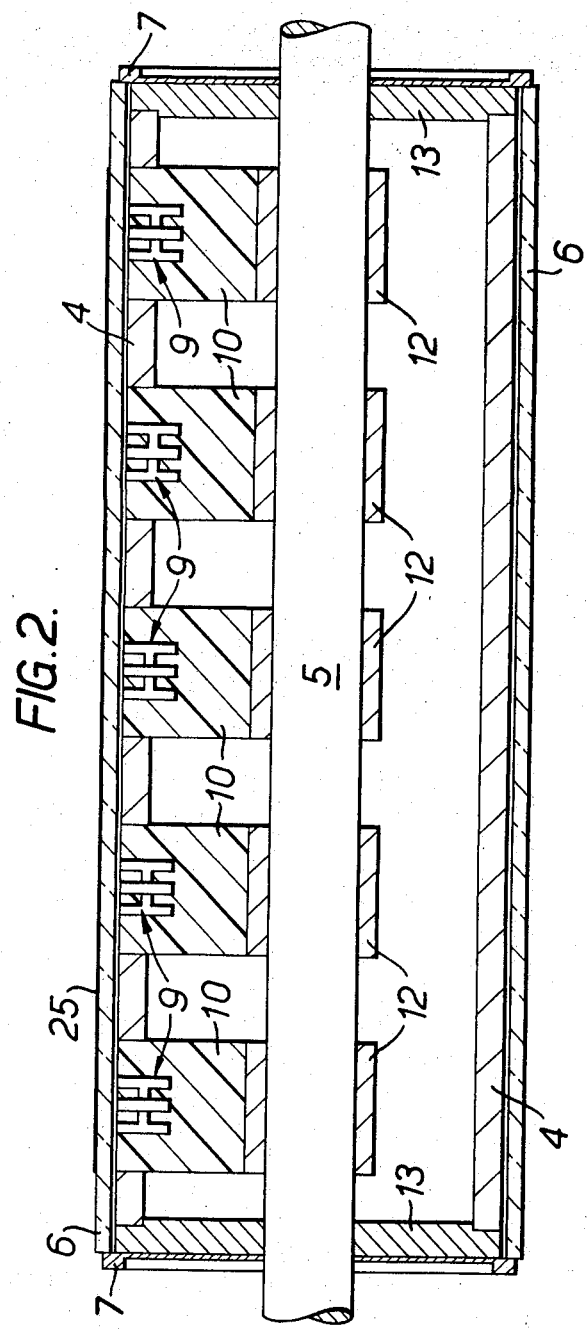

In the accompanying drawings:

FIG. 1 shows in cross-section one apparatus in accordance with the present invention, FIG. 2 shows a section on line II — II of FIG.1, 1, and FIG. 3 shows a detail of one part of the apparatus of FIGS. 1 and 2.

FIGS. 1 and 2 show an annular non-rotatable steel cylinder 4 supported on shaft 5 by end walls 13. A glass and resin hollow cylinder 6 of uniform thickness surrounds non-rotatable cylinder 4. The hollow cylinder 6 is fitted to the outer surface of non-rotatable cylinder 4, but is free to rotate about non-rotatable cylinder 4. Lubrication ducts 8 and channels 11 are provided in non-rotatable cylinder 4 to supply lubricant under pressure into the space between hollow cylinder 6 and the surface of non-rotatable cylinder 4. Lubricant seals 7 are provided at each end of non-rotatable cylinder 4 to prevent leakage of lubricant. The inner and outer surfaces of the hollow cylinder 6 are coated with a thin layer (not shown) of tungsten carbide, an abrasion-resistant material.

The non-rotatable cylinder 4 is relieved at five positions in one axial plane across its width and at each position a device 9 for detecting a magnetic property of metal strip is inserted so that it extends substantially to the surface of the non-rotatable cylinder 4. Each device 9 is embedded in an epoxy resin plug 10 which provides support and some protection from mechanical damage to the device 9. Each plug 10 is in turn supported by a metal block 12 rigidly attached to the shaft 5. In this way each device 9 is supported upon shaft 5.

Each device 9 for detecting a magnetic property of metal strip comprises two H-shaped manganese-zinc ferrite cores 14 and 15 each having two parallel arms 20 and 21 and a cross-piece 22 as shown in FIG. 3. The cores 14 and 15 are rigidly connected at the centre of each cross-piece 22 so that they are mutually perpendicular to one another.

Search coils 16 and 17 are wound around only one arm 20 of the parallel arms of each core 14 and 15, coil 16 being on one side of the cross-piece 22 and the coil 17 being on the other side. Coils 16 and 17 are connected in opposition by wire 26 to terminals 27 and 28. Additionally, each core 14 and 15 has an exciter coil 23 wound around its cross-piece 22. In FIG. 3 for clarity only core 14 is shown with the search and exciter coils in position. The various leads from the device 9 are run into shaft 5 and along the shaft 5 to be connected with measuring or comparing apparatus which is not shown.

In use a moving steel strip 25 whose magnetic properties, such as the permeability, it is desired to detect or measure, is passed around part of the hollow cylinder 6 under tension causing hollow cylinder 6 to rotate relative to non-rotatable cylinder 4. Because the speed of movement of the strip 25 can vary, there will be a tendency at certain times for the hollow cylinder 6 to be moving at a different linear velocity from that of strip 25. The abrasive resistant coating on the hollow cylinder 6 prevents undue wear under these conditions. The devices 9 are mounted in the relieved portions of non-rotatable cylinder 4 so that the devices are adjacent to the strip 25 passing around hollow cylinder 6. Thus, the devices 9 are always a fixed distance away from strip 25, the distance being the thickness of hollow cylinder 6 plus the thickness of an oil film between the non-rotatable cylinder 4 and hollow cylinder 6 which is supplied by lubrication ducts 8 and channels 11. The thickness of the oil film will be small in relation to the thickness of hollow cylinder 6.

In order to detect a magnetic property of the steel strip 25 as it passes a fixed distance away from the device 9, an alternating current is applied to the exciter coil 23 on the cross-piece of core 14. This induces a magnetic flux between the ends of arms 20 and 21 distant from strip 25. The magnetic flux induced between the ends of arms 20 and 21 nearest to the strip will be modified by the presence of the steel strip 25, and hence the voltage induced in the search coil 16 on the end of arm 21 nearest to the strip will be different from the voltage induced in search coil 17 and the end of arm 21 distant from the strip. As the search coils 16 and 17 are connected in opposition, the voltage induced in coil 16 will be of opposite polarity to the voltage induced in coil 17 and the net voltage generated across terminals 27 and 28 will be the difference between the two respective induced voltages. This net voltage is a measure of a magnetic property of the steel strip, and can be recorded or measured by known means. If the strip 25 was not present the net generated voltage would be zero as the epoxy resin plug 10, the resin sleeve 6 and air non-ferromagnetic.

In a similar way, a magnetic property e.g. the permeability of the steel strip 25 in a direction perpendicular to a line between the ends of arms 20 and 21 is simultaneously detected using the coils (not shown) on the core 15 in the way described in the preceding paragraph. By measuring the net voltages generated from cores 14 and 15 the magnetic permeability of the steel strip in two mutually perpendicular directions can be compared.

Each device 9 across the width of roll 4 is activated to produce voltage signals in the manner described above, so that the value of a magnetic property such as permeability can be detected at each part of the strip 25 adjacent a device 9 across the width of the strip. As it is known that the magnetic properties of steel are affected by changes in internal tensile stress in the steel, the devices can be used to compare the internal tensile stress properties across the width of the strip. The internal tensile stress properties in turn affect the shape of the steel strip across its width, so that the apparatus described can be used to effectively measure the shape of steel strip, either as it exits from a rolling mill or prior to the strip entering a rolling mill. These measurements can then be used to control the rolling mill to produce strip of more consistent shape.

The apparatus may replace an existing guide or billy roll in a rolling mill installation, or alternatively may be added to the installation. We claim:

1. Detecting apparatus for use with a moving metal strip, including a non-rotatable cylinder having a plurality of recesses at spaced locations in its circumferential surface, a sleeve of high electrical resistivity material located around the circumference of the cylinder, and supported by the cylinder for rotation about the cylinder axis, duct means with the cylinder for supplying lubricant to the interface between the cylinder and the sleeve, and an integral, magnetic flux inducing and detecting device mounted in each of said recesses in the cylinder for detecting an electrical or magnetic property of the metal strip, each of said devices comprising two mutually perpendicular, integral, H-shaped cores intersecting each other at the center of the cross piece and disposed normal to the path of said strip with one end of the core of the device positioned substantially at the circumferential surface of said cylinder, means for inducing a flux in each of the H-shaped cores of the two mutually perpendicular cores, and means for detecting a response to the resulting magnetic flux of each of said H-shaped cores and determining a measure of the magnetic permeability of said strip in two mutually perpendicular directions at each of said devices, the arangement being such that in use the moving metal strip passes partly around the sleeve causing the sleeve to rotate relative to the cylinder, the devices mounted in the recesses in the cylinder remaining in a fixed position adjacent to the moving metal strip.

2. Apparatus according to claim 1 in which the cylinder is mounted on a central shaft running along its longitudinal axis.

3. Apparatus according to claim 2 in which, said devices for detecting an electrical or magnetic property of the metal strip are supported by the central shaft.

4. Apparatus according to claim 1 in which the sleeve is coated with an abrasion resistant material.

5. Apparatus according to claim 1 in which said devices lie along a line located in a plane containing the axis of the cylinder.

6. Detecting apparatus according to claim 1 in which the legs of one of the H-shaped cores of each of said devices are disposed transverse to the direction of travel of said strip.

7. Detecting apparatus according to claim 1 in which the means for detecting a flux in each of said H-shaped cores comprises a search coil wound around only one of the legs of the H-shaped cores and on either side of the cross piece of the H-shaped core.

* * * * *